Figure 1:
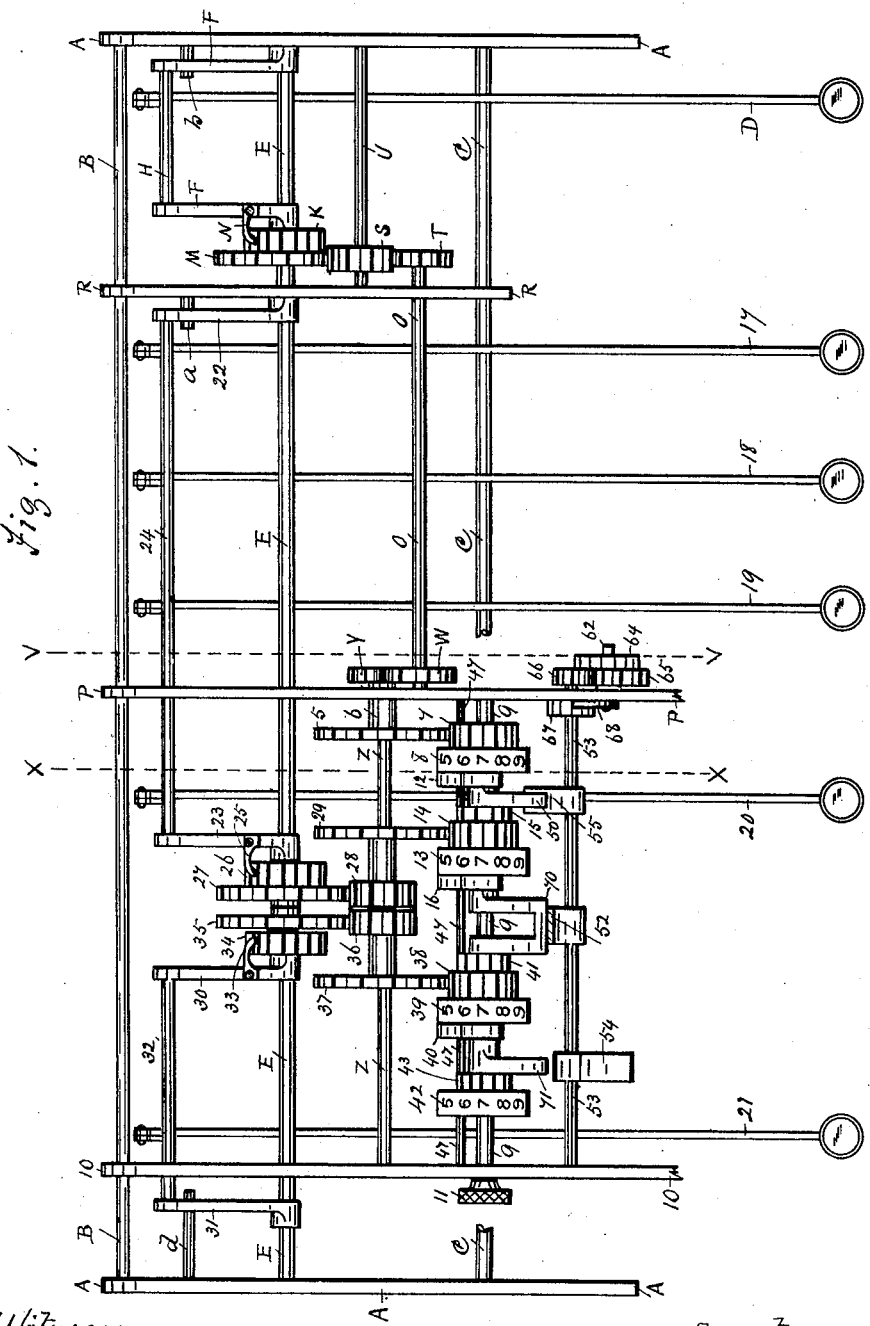

No. 678,350. Patented July 9, 1901.
S. H. POCOCK.
AUTOMATIC REGISTER OR RECORDER.
(Application filed Sept. 14, 1900.)
(No Model.) 3 Sheets—Sheet 1.

Witnesses.
M. S. Fraser.

Inventor.
Stephen H. Pocock.
By John H. Hendry, Atty.

THE NORRIS PETERS CO., PHOTO-LITHO., WASHINGTON, D. C.

No. 678,350. Patented July 9, 1901.
S. H. POCOCK.
AUTOMATIC REGISTER OR RECORDER.
(Application filed Sept. 14, 1900.)
(No Model.) 3 Sheets—Sheet 2.
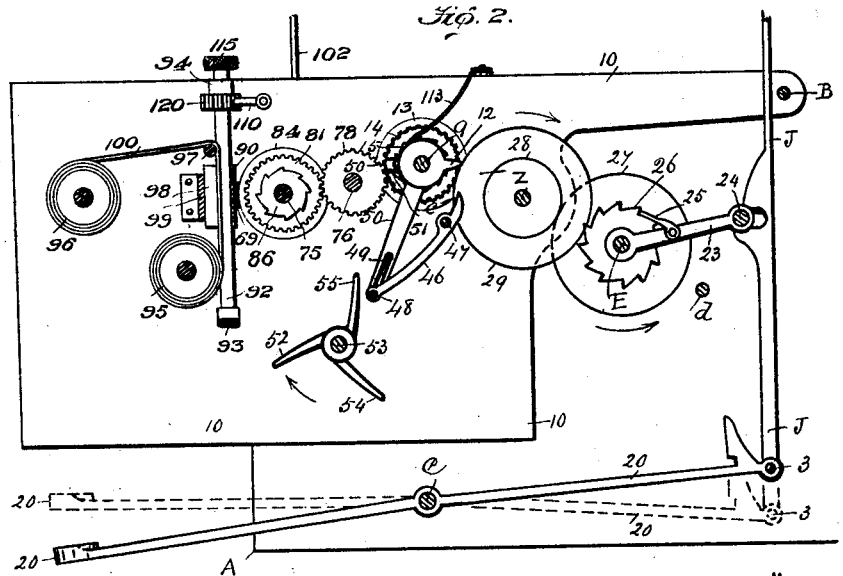
Fig. 2.
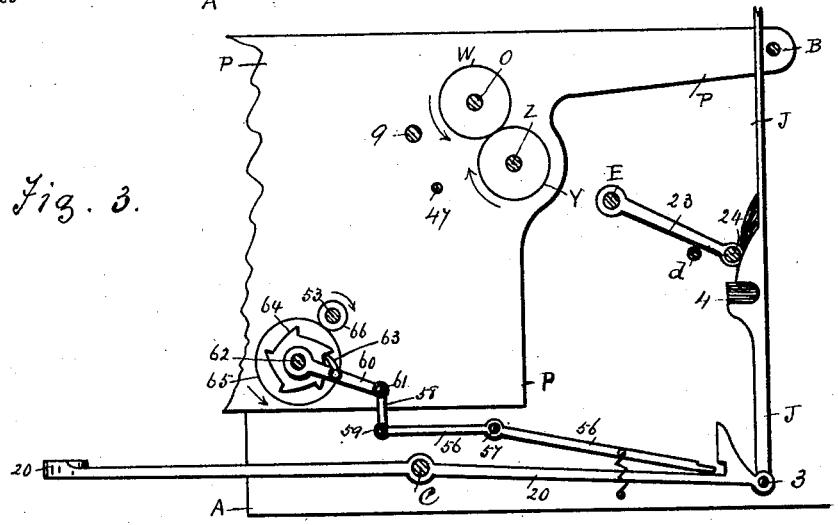
Fig. 3.
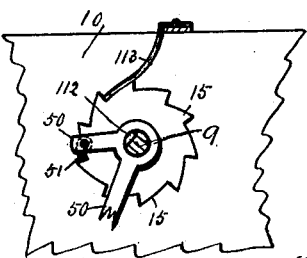
Fig. 9.
Fig. 8.
Witnesses.
M. S. Fraser
N. McPherson
Inventor.
Stephen H. Pocock.
By John H. Hendry, Atty.
THE NORRIS PETERS CO., PHOTO-LITHO., WASHINGTON, D. C.

No. 678,350. Patented July 9, 1901.
S. H. POCOCK.
AUTOMATIC REGISTER OR RECORDER.
(Application filed Sept. 14, 1900.)
(No Model.) 3 Sheets—Sheet 3.
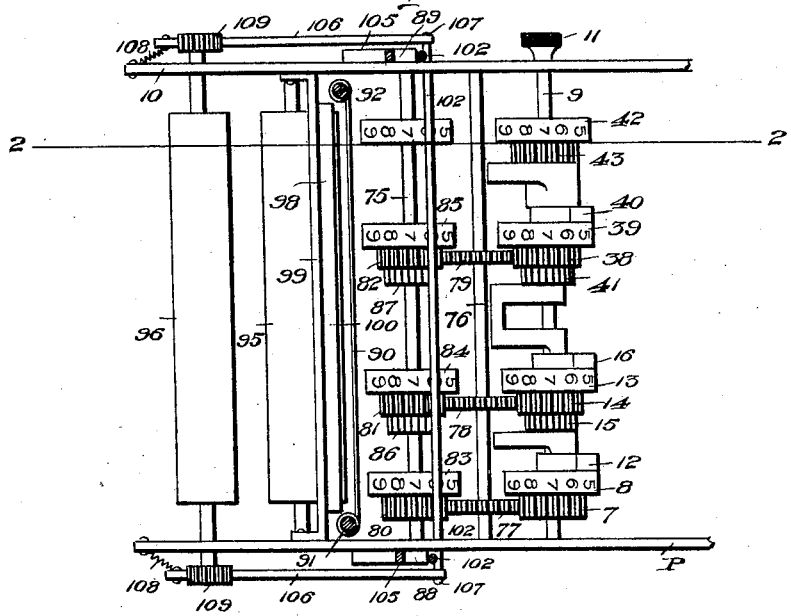
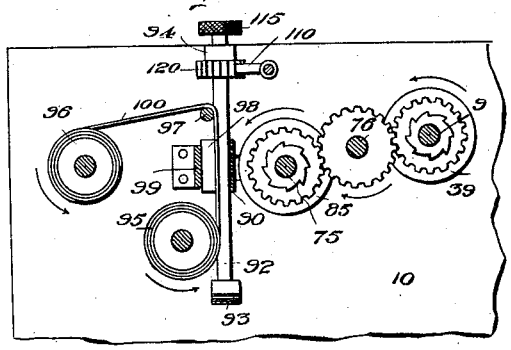
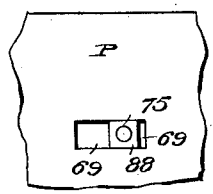
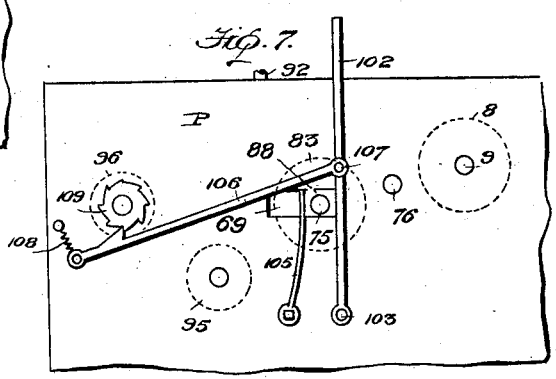
Witnesses
Inventor
Stephen H. Pocock.
by
Geo. R. Hamlin
Associate Attorney
THE NORRIS PETERS CO., PHOTO-LITHO., WASHINGTON, D. C.

UNITED STATES PATENT OFFICE.

STEPHEN H. POCOCK, OF HAMILTON, CANADA, ASSIGNOR OF ONE HUNDRED AND FIFTY-ONE TWO-HUNDREDTHS TO ALEXANDER GEORGE RUSSELL, JAMES W. MILLARD, AND SANFORD DENNIS BIGGAR, OF SAME PLACE.

AUTOMATIC REGISTER OR RECORDER.

SPECIFICATION forming part of Letters Patent No. 678,350, dated July 9, 1901.

Application filed September 14, 1900. Serial No. 30,010. (No model.)

*To all whom it may concern:*

Be it known that I, STEPHEN H. POCOCK, a citizen of Canada, residing at Hamilton, in the county of Wentworth and Province of Ontario, Canada, have invented certain new and useful Improvements in Automatic Registers or Recorders; and I do hereby declare the following to be a full, clear, and exact description of the invention, such as will enable others skilled in the art to which it appertains to make and use the same.

My invention relates to improvements in automatic registers or recorders in which a series of keys or banks of keys of a cash-register are separately connected to a series of section or bank frames by means of vertical lifting-rods of varying lengths connected to said keys, and in which mechanisms are connected with said section-frames and with a series of numerical disks and transferring devices for producing a visible record of sales-totals.

The object of my invention is to provide an automatic register which will be simpler and cheaper to build than those now in use and which will automatically and visibly register the total sales of a day or any desired period and which is provided with means by which the sales totals of the visible register may be printed on a roll of parchment at such intervals as it becomes desirable to set the visible register back to zero; and it consists, essentially, in the construction of parts hereinafter more specifically described and then definitely claimed.

Figure 1 is a plan of my invention, showing the section or bank frames in position to be operated by the lifting-rods connected to the keys, the said section-frames being connected by suitable mechanism to the numerical disks or adding device. In this view the total-printing device is omitted. Fig. 2 is an end elevation of the same through the broken line X X, showing one of the arms of the section-frame, one of the cams of the transferring device, the levers of the transferring device, and the rotating wings. Fig. 3 is an end elevation of the right-hand standard of the adding device through the broken line V V, showing one of the keys, a lifting-rod connected to said key, and mechanism operated by said key to operate the levers of the transferring device. Fig. 4 is an end elevation of one of the extended standards to show one of the horizontal slots with bearing. Fig. 5 is a plan of a continuation of the adding-device standards, showing the numeral-disks of Fig. 1 and the printing-disks, the inking-tape, the rubber pad, and the parchment roll of the totals-printing device. Fig. 6 is a section taken on the broken line 2 2 of Fig. 5, showing one of the vertical spools, which carries the inking-tape, the rubber pad, and the rollers for the parchment with a roll in position. Fig. 7 is an end elevation of Fig. 5, showing the mechanism for operating the printing-disks. Fig. 8 is an enlarged detail end view of one of the ratchet-wheels, a retaining-pawl, and the upper part of a transferring-lever; and Fig. 9 an enlarged detail of the spring-actuated pawl shown in Fig. 8.

Similar letters and figures of reference refer to similar parts throughout the several views.

In the drawings, A represents the end bearings or framework of a cash-register.

B is a stay-rod.

C is a fulcrum-rod for the operating-keys, and E is a longitudinal stationary fulcrum-rod extending to the ends A of the frame. On this fulcrum-rod E are the arms F, which are free to oscillate on the said rod E. These arms carry the roller H and are capable of being lifted by means of the lifting-rod J, which is connected to the key D at 3. These arms F and their roller H form the units section or bank frame. The first or right-hand section operates the units recording-disk, the second or middle section operates the tens-of-units disk, and the third or left-hand end section operates the hundreds-of-units disk. In the accompanying drawings the first section shows only one operating-key, representing five units, or five cents. In the second section only four keys are shown, though nine keys would be the full complement. In the third section only one key is shown, though this section-frame is suited to a machine provided with five keys, representing from one to five hundreds of units, or five dollars.

These three section-frames will never require more than nine keys each, and the first and the third sections may easily be extended in order to accommodate the full complement of keys. The units section-frame rests on the stop b of the frame A and is operated by depressing the key D. The roller H, together with the arms F, is raised by the vertical lifting-rod J, which is provided with a horizontal slot 4, just wide enough to take in the horizontal roller H, the lower lip of the slot extending slightly forward in a horizontal line with the slot, so that when it comes in contact with the roller H the said roller will roll into the slot 4 while on its upward circling path till on a level with its fulcrum-shaft E. It then rolls partly out of the slot, according to the height it is raised, the top of the slot acting as a stop to the roller on its upward path when the key has been depressed to its full extent, to prevent the section of which the roller is a part from being thrown up too high. The rotation of the roller reduces the friction to a minimum while this action is occurring. When the key is in its normal position, the slot is below the roller. (See Fig. 3.)

A ratchet-wheel K is journaled on the rod E in proximity to one of the arms F and is revolved by a pawl N on said arm when the arm is raised. This ratchet-wheel is attached to the friction or gear wheel M, free to revolve on the rod E. A shaft O, journaled in the adding-device standard P and the division-standard R, is revolved by means of a friction or gear wheel T, meshing with an intermediate wheel S, journaled on the shaft U of the units-section and meshing with the wheel M. The shaft O has a gear-wheel W fast thereon, which drives the gear-wheel Y, journaled on the intermediate stationary shaft Z of the adding-device standards. This wheel Y is connected with the friction or gear wheel 5 by means of the hub 6. This gear-wheel 5 gears into and drives the gear-wheel 7, which is attached to the units-disk 8, which revolves loosely on the shaft 9 of the adding device. This shaft extends from a bearing in the standard P and through a bearing in the standard 10 and has the hand-wheel 11 secured thereto. Thus one depression of the five-units key D previously referred to revolves the units-disk 8 one-half revolution, the disk bearing numerals on its periphery from "0" to "9," inclusive. As will be well understood by those familiar with registers of this nature, the extent of the partial revolution given the units-disk depends on the lift of the section-frame, and this depends on the distance between the roller H and the slot in the lifting-rod of the particular key operated, which varies for each key in the section. The same principle is of course followed out in all the sections of the machine.

The tens-of-units disk 13 on the shaft 9 is provided with a gear-wheel 14 and a ratchet-wheel 15, attached to the said gear-wheel. A cam 16 is also attached to the other side of disk 13. All these parts revolve together loosely on the shaft 9.

The tens-of-units section-frame rests on a stop a of standard R and is operated by any of the keys 17, 18, 19, and 20, which form a part of the bank or sections of the tens of units, so that when any of these keys is depressed it raises the tens-of-units section-frame, just as the units section-frame is raised by the units-key D. The tens-of-units key 18 raises the corresponding tens-of-units section-frame higher than does the key 17, the key 19 raises the said section-frame higher than does the key 18, and the key 20 raises the said section-frame higher than does the key 19. This is accomplished by varying the position of the slots in the lifting-rods, as already described. The tens-of-units section-frame comprises the arms 22 and 23 with their roller 24. A pawl 25 on the arm 23 operates the ratchet-wheel 26, which is attached to the friction or gear wheel 27 and revolves with it on the shaft E. This gear-wheel 27 drives the gear-wheel 28, which is attached to the gear-wheel 29. These two wheels revolve loosely on the shaft Z. This gear-wheel 29 drives the gear-wheel 14, together with the attached tens-of-units disk 13 with its cam 16 and the ratchet-wheel 15. The hundreds-of-units section-frame is operated by the key 21 in a similar manner to that in which the keys previously referred to operate their corresponding section-frames. This section-frame comprises the arms 30 and 31 and their connecting-roller 32. This section-frame is also capable of revolving loosely on the shaft E and rests on stop d of the frame A. The arm 30 carries a pawl 33, which operates the ratchet-wheel 34, which is attached to the friction or gear-wheel 35, journaled on the shaft E. The gear-wheel 35 drives the gear-wheel 36, which is attached to the gear-wheel 37, journaled on the shaft Z. The gear-wheel 37 drives the gear-wheel 38, which is attached to the hundreds-of-units disk 39, with its attached cam 40. A ratchet-wheel 41 is attached to said wheel 38. These parts revolve together loosely on the shaft 9.

The numeral-disk 42 is designed to register tens of hundreds of units and is operated only by the transferring device I am about to describe. The disk is provided with the ratchet-wheel 43, which forms part of the transferring device referred to. The transferring device for shifting the tens numerical disk after the lower one has again reached "0" consists of a cam 12, as shown in Fig. 2 of the drawings. This cam 12 when revolved with its numeral-disk 8 to a certain point engages the lip c of the contact-lever 46, which is fulcrumed on the rod 47 of the adding-device standards P and 10. The lower end of this lever is connected at 48 with the slot 49 of the transferring-lever 50 by means of a suitable pin. This lever is fulcrumed on shaft 9 and has a spring-actuated pawl 51 connected therewith, as shown in Fig. 8 of the drawings, to engage with the ratchet-wheel 15. When the lip of the cam 12 engages and passes the lip of contact-lever 46, the lower end of the said lever is swung forward and carries with it the lever 50. When the wing 52 of shaft 53, as hereinafter described, engages the lever 50, forcing it forward, the pawl 51 engages and revolves the ratchet-wheel 15 one tooth, and the said ratchet-wheel 15, being attached to the numeral-disk 13, causes it to revolve one numeral. This shaft 53 is journaled in the adding-device standards P and 10 and, with its wings 52, 54, and 55, is revolved as a key rises after depression. When a key is depressed, the rear end is raised and carries with it an ordinary coupler 56, fulcrumed at 57, as shown in Fig. 3 of the drawings. The forward part of the coupler is lowered, and with it the connecting-rod 58, which is pivoted at 59 to said coupler. A lever 60 is pivoted to the said rod 58 at 61 and is journaled on the stud 62 of the standard P. This lever 60 carries a pawl 63 to revolve the ratchet-wheel 64, which is attached to the gear-wheel 65, which meshes with a gear-wheel 66, secured on the said shaft 53, which is provided with a ratchet-wheel 67 with retaining-pawl 68, as in Fig. 1 of the drawings. When the ratchet-wheel 64 makes one-fifth of a revolution, the shaft 53 makes a complete revolution. The wings of the shaft 53 are so arranged as to engage with the transferring-levers 50, 70, and 71. The wing 52 is shown in Fig. 1 of the drawings engaging with the lever 70, and in Fig. 2 of the drawings the wing 55 is engaging with the lever 50, the several wings acting successively on their respective levers to revolve the numeral-disks to transfer from units to tens of units, from tens of units to hundreds of units, and from hundreds of units to tens of hundreds of units. It will be understood that each of the transferring-levers is fitted exactly the same as the lever 50.

In the portion of the machine concerned with the registering of the sales totals the shaft Z and its connected gear-wheels serve merely to convey the motion of the sections to the gears operating the numeral-disk, and other connections might easily be substituted.

The printing device of this machine is shown in Figs. 5, 6, and 7 of the drawings in connection with the numeral-disks and gear-wheels on the shaft 9. Parallel with this shaft is a shaft 75 and an intermediate shaft 76. On the shaft 76 are journaled the gear-wheels 77, 78, and 79, which gear into the wheels 7, 14, and 38, respectively, and are driven independently by said wheels. The gear-wheels on this shaft 76 mesh with the wheels 80, 81, and 82, journaled on the shaft 75. Attached to these wheels are the disks 83, 84, and 85, respectively, each disk bearing raised numerals. Ratchet-wheels 86 and 87 are attached, respectively, to the gear-wheels 81 and 82 and revolve with said wheels. The shaft 75 is journaled in bearings 88 and 89, respectively, in horizontal slots 69, as shown in Fig. 4 of the drawings in the standards P and 10. Said bearings are thus capable of being brought forward, so as to bring the printing numeral-disks in contact with the inking-tape 90, which is stretched from the vertical spool 91 to the spool 92, which spools are journaled in bearings 93 and 94 in the standards P and 10. A paper-roll 95 and a paper-receiving roll 96 are journaled in the standards P and 10 and parallel with said shaft 75. A rubber pad 98 on the bracket 99 is located to receive impressions. A roller 97 is journaled in the standards P and 10 and is in line with the paper-roll 95 to carry the parchment 100 from the roll 95 between and parallel with said pad and inking-tape and onto the roll 96. At the commencement and when the numeral-disks on shaft 9 are at zero, then the printing-disks on shaft 75 should be at zero. When any numeral-disk on shaft 9 is revolved, by means hereinbefore set forth, the corresponding printing-disk on shaft 75 revolves an equal distance.

To take an impression on the parchment immediately opposite to the pad 98, the shaft 75, with its raised numeral-disks, is brought forward, so that the said disks come into contact with the inking-tape, forcing said tape into contact with said parchment and causing the same to receive an impression of the numerals opposite the pad. To bring these numeral-printing disks on shaft 75 to engage with said tape to cause an impression on the parchment, lever 102 is provided and fulcrumed on the sides of the standards P and 10 at 103. By bringing this lever forward against the rear of the bearings 88 and 89 of the said shaft 75 these bearings are moved in their slots and the printing is done. 105 is a tension-spring to engage with the bearings of the shaft 75 to return it to its normal position. A ratchet-rod 106 is connected to the lever 102 at 107, and a retaining-spring 108 is attached to the forward end of the said rod 106 to cause the same to operate the ratchet-wheel 109, secured on end of the spindle of the receiving parchment-roll 96 to cause the same to revolve one tooth, thus moving the parchment-roll onward to be ready for the next impression.

When the numeral-printing disks on shaft 75 are in printing position, as described, the numeral-disks on shaft 9 may be reset to zero by means of the hand-wheel 11, secured on said shaft 9. This shaft has a groove 112, with one shoulder, as shown in Fig. 8 of the drawings, the disks on this shaft being provided with a spring-dog to operate against said shoulder when the shaft is operated by the hand-wheel 11. These parts are of course common in the art. The ratchet-wheels referred to on shafts 9 and 75 are provided with retaining-pawls 113, as shown in Fig. 8 of the drawings, secured to bars fast on the frame above the shafts. The vertical spools 91 and 92 referred to are provided with ratchet-wheels 120 and are operated by the hand-wheel 115 to wind the ribbon-tape 90 from one spool to the other. 110 represents retaining-pawls for holding said ratchet-wheel 120.

It will be observed that the gear or friction wheels referred to may be made of suitable material and construction for the adoption of friction-wheels in varied places in lieu of gear-wheels. It will also be observed that my invention is completely embodied in that part of the machine comprising the tens and units numeral disks, the connection with their respective keys, and the device for transferring from one disk to the other.

From the construction described it will be evident that I have devised simple means for registering sales totals for any desired period and for preserving a record of any number of such totals for any desired longer period, thus materially assisting the owner of the instrument in keeping record of his business, cash turn-over, and in comparing the business done at different periods.

Various changes in the form, proportion, and minor details of this invention may be resorted to without departing from the spirit and scope thereof. Hence

What I claim as my invention, and desire to secure by Letters Patent, is—

1. In an automatic register or recorder, provided with pivoted keys, the combination with the said keys of a frame; a longitudinal shaft carried by the said frame; a gear-wheel journaled on the said shaft; means for rotating the said gear-wheel by the depression of a key; a units section-shaft U, carried by the frame parallel to the aforesaid shaft, a gear-wheel S thereon meshing with the aforesaid gear-wheel; a shaft O, carried by the frame parallel to the shaft U; a gear-wheel T, thereon meshing with the gear-wheel S; a shaft Z, carried by the frame parallel to the shaft O; meshing gear-wheels W and Y journaled on the shafts O and Z; a gear-wheel 5, journaled on the shaft Z and connected to the gear-wheel Y; a numeral-disk shaft 9 carried by the frame parallel to the shaft Z; a gear-wheel 7 journaled thereon and meshing with the gear-wheel 5; and a numeral-disk 8 connected to the said gear-wheel, substantially as and for the purpose specified.

2. In an automatic register or recorder provided with pivoted keys the combination with the said keys of a frame; a numeral-disk shaft 9; a numeral-disk journaled on the said shaft; means for rotating the said numeral-disk by the depression of a key; a cam attached to the said disk; a transferring-lever journaled on the said shaft in proximity to the said cam; a contact-lever independently fulcrumed and having one end normally in the path of the said cam and the other pivotally and adjustably connected to the transferring-lever; a pawl carried by the transferring-lever; a tens-disk journaled on the shaft 9; a ratchet-wheel connected with the said tens-disk and engaged by the said pawl; and means directly actuated by the keys for returning the transferring-lever to its normal position after it has been thrown forward by the action of the cam on the contact-lever, substantially as and for the purpose specified.

3. In an automatic register or recorder, provided with pivoted keys the combination with the said keys of a frame; a numeral-disk shaft 9; a numeral-disk journaled on the said shaft; means for rotating the said numeral-disk by the depression of a key; a cam attached to the said disk; a transferring-lever journaled on the said shaft in proximity to the said cam; a contact-lever independently fulcrumed and having one end normally in the path of the said cam and the other pivotally and adjustably connected to the transferring-lever; a tens-disk journaled on the shaft 9; a ratchet-wheel connected with the said tens-disk and engaged by the said pawl; a shaft journaled in the frame adjacent to the lower end of the transferring-lever; a wing on the said shaft adapted to engage the said lever and means for rotating the said shaft by the movement of a key when rising after being depressed, substantially as and for the purpose specified.

4. In an automatic register or recorder provided with pivoted keys the combination with the said keys of a frame; a numeral-disk shaft 9; a numeral-disk journaled on the said shaft; means for rotating the said numeral-disk by the depression of a key; a cam attached to the said disk; a transferring-lever journaled on the said shaft in proximity to the said cam; a contact-lever independently fulcrumed and having one end normally in the path of the said cam and the other suitably connected to the lower end of the transferring-lever; a pawl carried by the transferring-lever; a tens-disk journaled on the shaft 9; a ratchet-wheel connected with the said tens-disk and engaged by the said pawl; and means directly actuated by the key for returning the transferring-lever to its normal position after it has been thrown forward by the action of the cam on the contact-lever; independent means for operating the said tens-disk by the depression of suitable keys; and a pawl connected to a standard of the machine and engaging the aforesaid ratchet-wheel, substantially as and for the purpose specified.

5. In an automatic register or recorder provided with pivoted keys the combination of a frame, a shaft carried by the said frame, numeral-disks journaled on the said shaft; means for operating said disks to register cash totals; a printing-disk shaft journaled parallel to the numeral-disk shaft and movable toward and away from it; printing numeral-disks journaled on the said shaft; gearing adapted for normally connecting each numeral-disk with its corresponding numeral-printing disk; means for receiving an impression from the said numeral-printing disks;

and independent hand-operated mechanism for moving the said printing-disk shaft away from the numeral-disks to produce the said impression, substantially as and for the purpose specified.

6. In an automatic register or recorder provided with pivoted keys the combination of a frame, a shaft carried by the said frame, numeral-disks journaled on the said shaft; means for operating said disks to register cash totals; a printing-disk shaft journaled parallel to the numeral-disk shaft and movable toward and away from it; printing numeral-disks journaled on the said shaft; gearing adapted for normally connecting each numeral-disk with its corresponding numeral-printing disk; an impression-pad suitably supported; means for drawing the paper over the pad; an inking tape or ribbon suitably held in proximity to the paper, and independent hand-operated mechanism for moving the said printing-disk shaft to make an impression against the ribbon and on the said paper, substantially as and for the purpose specified.

7. In an automatic register or recorder provided with pivoted keys, the combination of a frame, suitably slotted; a printing-disk shaft; bearing-boxes for the said shaft carried in the slots of the frame; numeral-printing disks carried by the said shaft; numeral-disks journaled suitably in the machine; means for recording cash totals on the said numeral-disks; gearing connecting the numeral-disks with the numeral-printing disks; a hand-lever pivoted on the frame of the machine and adapted to engage the bearings of the printing-disk shaft to bring it forward for printing purposes; tension-springs adapted to retract the said shaft; and means for receiving the impression of the said printing-disks, substantially as and for the purpose specified.

8. In an automatic register or recorder provided with pivoted keys, the combination of a frame; suitably slotted; a printing-disk shaft; bearing-boxes for the said shaft carried in the slots of the frame; numeral-printing disks carried by the said frame; numeral-disks journaled suitably in the machine; means for registering cash totals on the said numeral-disks; gearing connecting the numeral-disks with the numeral-printing disks; a hand-lever pivoted on the frame of the machine and adapted to engage the bearings of the printing-disk shaft to bring it forward for printing purposes; tension-springs adapted to retract the said shaft; an impression-pad suitably supported; means for drawing the paper over the pad; and an inking tape or ribbon suitably held in proximity to the paper, substantially as and for the purpose specified.

9. In an automatic register or recorder, the combination with a plurality of numeral-disks suitably journaled and provided with means whereby they may be caused to register cash totals of a corresponding number of numeral-printing disks movable away from the numeral-disks but normally geared to the said numeral-disks to revolve therewith; means for recording impressions from the said numeral-printing disks; and means for moving the said numeral-printing disks into contact with the means for recording impressions when desired, substantially as and for the purpose specified.

10. In an automatic register or recorder, a plurality of numeral-disks suitably journaled; means for revolving said disks by the action of the keys; means for transferring from a lower disk to a higher when the lower disk has completed a revolution in combination with a corresponding number of numeral-printing disks movable away from the numeral-disks but normally geared to the said numeral-disks; means for recording impressions from the said numeral-printing disks; and means for moving the said numeral-printing disks into contact with the means for recording impressions when desired, substantially as and for the purpose specified.

11. In an automatic register or recorder, the combination of a main frame; a suitably-journaled section-frame provided with a lifting-bar; one or more pivoted keys; lifting-rods connected to the said keys and adapted to engage the said lifting-bar to rock the section-frame, a ratchet-wheel carried on the same journal as the section-frame; a pawl on the section-frame engaging the said ratchet-wheel; a gear-wheel connected to the said ratchet-wheel; a numeral-disk shaft suitably carried by the frame of the machine; a numeral-disk journaled on the said shaft; a gear-wheel secured to the said disk; intermediate gearing between the said gear-wheel and the section-frame gear-wheel; a second numeral-disk journaled on the numeral-disk shaft; a ratchet-wheel secured to the said numeral-disk; a transferring-lever suitably journaled; a pawl on the said lever adapted to engage the said ratchet-wheel; means controlled by the said first-mentioned numeral-disk, for swinging the said transferring-lever in one direction at a set time; means operated by the rising of a key to swing the said transferring-lever in the reverse direction and thus turn the ratchet-wheel; and a retaining-pawl carried on a stationary part and engaging the said ratchet-wheel, substantially as and for the purpose specified.

12. In an automatic register or recorder, the combination of a main frame; a suitably-journaled section-frame provided with a lifting-bar; one or more pivoted keys; lifting-rods connected to the said keys and adapted to engage the said lifting-bar to rock the section-frame; a ratchet-wheel carried on the same journal as the section-frame; a pawl on the section-frame engaging the said ratchet-wheel; a gear-wheel connected to the said ratchet-wheel; a numeral-disk shaft suitably carried by the frame of the machine; a numeral-disk journaled on the said shaft; a gear-wheel secured to the said disk and intermediate gearing between the said gear-wheel and the section-frame gear-wheel, a second numeral-disk on the numeral-disk shaft; means for transferring from the first disk to the second when the first disk has completed a revolution; a gear-wheel connected to the second numeral-disk; a second section-frame provided with a lifting-bar; one or more pivoted keys; lifting-rods connected to the said keys and adapted to engage the said lifting-bar to rock the section-frame; a ratchet-wheel carried on the same journal as the section-frame; a pawl on the section-frame engaging the said ratchet-wheel; a gear-wheel connected to the said ratchet-wheel; and gearing connecting the said gear-wheel with the gear-wheel of the second numeral-disk, substantially as and for the purpose specified.

13. In an automatic register or recorder, the combination with a register, of independent transferring mechanisms for transferring the totals thereon, each consisting of a lever movable idly in one direction from its normal position and adapted to positively engage and turn the register of higher value when moved in the opposite direction toward the normal position of said lever, a device for automatically shifting said lever idly from its normal position when the lower register has made up its total, a rotary shaft having wings extending out therefrom in different directions which are adapted, in succession, to engage with and move the levers back to normal position and thereby cause them to positively engage the registers of higher value and make the transfers of totals, sales-indicating keys, and mechanism interposed between said keys and the rotary shaft whereby the latter is directly operated by the movement of said keys.

14. In an automatic register or recorder, the combination with independent registering devices, of mechanism adapted for tranferring the total of one register to the register of next higher order which consists of a lever movable idly in one direction, a ratchet-wheel on the register of higher order, a pawl on the lever adapted to engage said ratchet-wheel when the lever is moved toward normal position, a pivoted contact-lever having an adjustable connection with the aforesaid lever, a cam on the register of lower order adapted to engage and move said contact-lever and thereby shift the first-named lever idly, when the said register has made up its total, operating-keys, and mechanism directly operated by the movement of said keys which is adapted to move the lever toward normal position and thereby cause the transfer to be made.

15. In an automatic register or recorder, the combination with a register and means for transferring the totals thereon, operating-keys, mechanism for shifting said transferring mechanism, a shaft operatively connected with said shifting mechanism, a ratchet-wheel on said shaft, operating-keys, a coupler directly operated from the keys, a lever connected to the coupler, and a pawl on the lever for engaging the ratchet-wheel.

16. In an automatic register or recorder, the combination with a register, of transferring mechanism for transferring the totals thereon, a shaft having wings for actuating the respective transferring mechanisms, a second shaft, operatively connected with said shaft, a ratchet-wheel on the second shaft, operating-keys, a coupler directly operated by the keys, and a pawl operated by the coupler for actuating the ratchet-wheel.

17. In an automatic register or recorder, the combination with rotary numeral-disks, of numeral-printing disks movable away from the numeral-disks but normally geared to the said numeral-disks to revolve therewith, means for keeping said printing-disks normally geared to the numeral-disks, a roll for the paper on which the impression is to be taken which is provided with a ratchet-wheel, a pivoted hand-lever adapted to shift the printing-disks to disengage them from the numeral-disks and to make the impression, a ratchet-rod connected to the lever and adapted to engage the ratchet-wheel to turn the paper-roll and means for holding the ratchet-rod in engagement with the ratchet-wheel.

In testimony whereof I affix my signature in presence of two witnesses.

STEPHEN H. POCOCK.

Witnesses:
JOHN H. HENDRY,
A. E. YOUNG.